United States Patent [19]

Hodson

[11] 4,398,842
[45] Aug. 16, 1983

[54] METHOD OF OVERLAY AND SANDWICH FORMATION OF PERVIOUS CONCRETE

[76] Inventor: Harry Hodson, 4730 Dunn Dr., Sarasota, Fla. 33583

[21] Appl. No.: 220,519

[22] Filed: Dec. 29, 1980

[51] Int. Cl.³ .......................................... E01C 19/00
[52] U.S. Cl. ...................................... 404/82; 404/2; 404/75; 405/45
[58] Field of Search .................. 404/75, 82, 31, 36, 404/72, 2; 405/45, 38

[56] References Cited

U.S. PATENT DOCUMENTS

| | | | |
|---|---|---|---|
| 271,089 | 1/1883 | Lynch | 426/422 |
| 358,288 | 2/1887 | Moore | 404/27 |
| 423,796 | 3/1890 | Murdock | 404/82 |
| 525,146 | 8/1894 | Haddock | 404/82 |
| 1,655,104 | 1/1928 | Oakley | 404/4 X |
| 2,078,289 | 4/1937 | Sloan | 404/82 X |
| 2,126,191 | 8/1938 | Hubbell | 404/82 X |
| 2,130,498 | 9/1938 | Klemschofski | 405/45 |
| 2,277,203 | 3/1942 | Boult | 404/82 X |
| 2,721,369 | 10/1955 | Burke | 404/82 X |
| 3,038,393 | 6/1962 | Wagin | 404/31 |
| 3,196,122 | 7/1965 | Evans | 427/140 |
| 3,240,736 | 3/1966 | Beckwith | 106/90.97 X |
| 3,360,493 | 12/1967 | Evans | 524/5 |
| 3,439,450 | 4/1969 | Richards | 106/97 |
| 3,477,979 | 11/1969 | Hillyer | 523/401 |
| 3,687,021 | 8/1972 | Hensley | 404/31 |
| 3,690,227 | 9/1972 | Welty | 404/10 |
| 3,822,229 | 7/1974 | McMaster | 523/401 |
| 3,853,417 | 12/1974 | Olsson | 404/75 X |
| 3,870,422 | 3/1975 | Medico | 404/31 |
| 4,225,357 | 9/1980 | Hodson | 106/86 |

FOREIGN PATENT DOCUMENTS 230230 9/1960 Australia .............................. 404/82

*Primary Examiner*—Nile C. Byers, Jr.
*Attorney, Agent, or Firm*—A. W. Fisher, III

[57] ABSTRACT

A method of overlay and sandwich formation of a combination of pervious concrete with itself and/or standard cement concrete wherein the existing surface is cleaned either mechanically or chemically, a coating of cement and water mortar, mixed in a high energy/shear type mixer, is then applied, and pervious concrete is directly applied to any required thickness, which results in a complete bonding between the overlay and the original pavement. To apply pervious concrete to reinforced concrete slab construction, in cases where lateral water movement may be undesirable, a similar procedure is used after transverse penetration of the reinforced slab with holes spaced so as to clear reinforcing steel and of sufficient size and area to permit the drainage of the combined slab. These holes will be filled with pervious concrete during the overlay procedure.

6 Claims, 4 Drawing Figures

METHOD OF OVERLAY AND SANDWICH FORMATION OF PERVIOUS CONCRETE

BACKGROUND OF THE INVENTION

1. Field of the Invention

A method of overlay and sandwich formation of a combination of pervious concrete with itself and/or standard cement concrete.

2. Description of the Prior Art

In the construction and building industry the term "concrete" is used generically to define a collection or aggregation of materials which together form a reasonably continuous solid. Prior art products include both natural concrete and a variety of synthetic concretes, the most common of such products being asphaltic concrete, in which inert aggregates are mixed with a bituminous binding component, and Portland cement concrete. In Portland cement concrete the object is to obtain a continuous monolithic material of substantially uniform properties. In conventional and by far the majority of normal applications of concrete, voids and/or small discontinuities or inclusions of air are considered to be highly undesirable since these voids, etc. harmfully affect the operating or performance characteristics of the end concrete product.

However, in the specialized category of pervious concrete such voids are intentional in the formation of the concrete product. While such discontinuous concrete is generally well known in the prior art, this concrete suffers from inherent problems which make the overall product relatively undesirable. Such prior art porous concretes are generally considered of variable quality and indeterminate permability and thus unreliable or defective for controlled or specified construction applications.

The following U.S. patents disclose prior art products and/or methods of forming concrete products or cementitious material which are generally applicable but clearly distinguishable from the product and process of the present invention, described hereinafter: U.S. Pat. Nos. 271,089, to Lynch; 358,288 to Moore; 1,665,104 to Martienssen; 3,196,122 to Evans; 3,240,736, to Beckwith; 3,360,493 to Evans; 3,439,450 to Richards; 3,477,979 to Hillyer; 3,687,021 to Hensley; 3,690,227 to Weltry; 3,870,422, to Medico; 2,130,498 to Klemschofski; and 3,822,229 to McMaster.

As evidenced by the prior art set forth above there is an obvious desirability and need for discontinuous concrete products. Such products generally and/or theoretically would be much more efficient where drainage of water is desired pertinent to concrete product applications such as in highways, airports, parking facilities, bridge decks, etc.

However, products of the type disclosed in the above set forth U.S. patents frequently suffer from certain inherent disadvantages such as surface fracture when used under heavy load or stress conditions (commonly called ravelling) in roads, highways, and pavement where they are generally formed using substantially conventional concrete placing techniques or processes, with or without the application of additives to allegedly increase adhesion between the aggregate particles and improve other performance characteristics.

Moreover, pervious concrete in any of its described forms is of value in paving and other engineering applications because of its ability to permit water percolation isotropically through its substance. In engineering applications, however, certain structural uses of concrete such as bridges, culvert covers, walks and similar, cannot be usefully constructed with a pervious concrete, since any necessary reinforcement included in such concrete will experience relatively rapid attack and deterioration. Again, for pavement (either of pervious or monolithic concrete) repair or refurbishing by the addition of an integrated surface layer of pervious concrete is an obviously desirable objective.

Finally, engineering applications involving the construction of a pervious core between layers of monolithic concrete may be required.

Thus, there is a great need in the construction and building or repairing industry, specifically in building roads, highways and bridges for a porous concrete having an even distribution of liquid flow therethrough and which can better provide for traction or stress conditions from high speed operation of automobiles or large vehicles such as trucks, airplanes, or the like.

SUMMARY OF THE INVENTION

The present invention relates to a method of overlay and sandwich formation of a combination of pervious concrete with itself and/or standard cement concrete. In engineering applications certain structural uses of concrete such as bridges, culvert covers, walks and similar, cannot be usefully constructed with a pervious concrete, since any necessary reinforcement included in such concrete will experience relatively rapid attack and deterioration.

As disclosed in U.S. Pat. No. 4,225,357, a predetermined quantity of cement is continuously fed to a high energy mixing facility concurrently with the application thereto of predetermined quantities of water being brought into intimate contact with the cement particles through a spray facility. The quantities of cement and water were thereby mixed in a manner which accomplished a viscous shear flow thereby providing a predetermined degree of hydration of the cement particles which produced a resulting cementitious material batch having a continuous and consistent viscosity. The aforementioned resulting cementitious material batch served as a uniform slurry of high viscosity capable of uniform coating and binding the individual particles of aggregate and preventing segregation of the cement-water component or concentration of the aggregate, itself.

Distribution of the resulting concrete product while still in a highly mobile state may be accomplished by methods described in U.S. Pat. No. 4,225,357 or in any other conventional manner. This pervious concrete product is then applied by the following methods.

Overlay of pervious or non-pervious paving requires cleaning of the surface of the existing paving. To the cleaned surface a coating of cement and water mortar, mixed in a high energy/shear type mixer such as used in the preparation of pervious concrete may be applied. On the cleaned and/or coated surface an overlay of pervious concrete is directly applied to any required thickness, which results in a complete bonding between the overlay and the original pavement. To apply pervious concrete to reinforced concrete slab construction, in cases where lateral water movement may be undesirable, a similar procedure to the above is used after transverse penetration of the reinforced slab with holes or drain apertures spaced so as to clear reinforcing steel and of sufficient size and area to permit the drainage of the combined slab. These holes will be filled with pervious concrete during the overlay procedure.

The invention accordingly comprises the features of construction, combination of elements, and arrangement of parts that will be exemplified in the construction hereinafter set forth. The scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a method of overlay and sandwich formation of a combination of pervious concrete with itself and/or standard cement concrete. Pervious concrete is of value in paving and other engineering applications because of its quality of permitting water percolation isotropically through its substance. In engineering applications, however, certain structural uses of concrete such as bridges, culvert covers, walks and similar, cannot be usefully constructed entirely with a pervious concrete, since any necessary reinforcement included in such concrete will experience relatively rapid attack and deterioration unless of specifically coated type. Again, for pavements (either of pervious or monolithic concrete) repair or refurbishing by the addition of an integrated surface layer of pervious concrete is an obviously desirable objective.

Finally, engineering applications involving the construction of a pervious core between layers of monolithic concrete may be required.

As disclosed in U.S. Pat. No. 4,225,357, a predetermined quantity of cement is continuously fed to a high energy mixing facility concurrently with the application thereto of predetermined quantities of water being brought into intimate contact with the cement particles through a spray facility. The quantities of cement and water were thereby mixed in a manner which accomplished a viscous shear flow thereby providing a predetermined degree of hydration of the cement particles which produced a resulting cementitious material batch having a continuous and consistent viscosity. The aforementioned resulting cementitious material batch served as a uniform slurry of high viscosity capable of uniform coating and binding the individual particles of aggregate and preventing segregation of the cement-water component or concentration of the aggregate itself.

However, an important step in the process of forming the resulting concrete product was the mixing of the aggregate subsequent to forming of the highly viscous mixture of cement and water. Aggregate particle size was such that less than ten percent by weight of the total amount of aggregate utilized was of a particle size of less than half of the maximum particle size of the remaining quantity of aggregate, to obtain maximum degree of permeability. Variations of this proportion will retain some permeability and increase compressive strength.

Mixture of the aggregate and the cementitious material batch or mixture was accomplished in a positive mechanical mixer which may be substantially of conventional design.

Distribution of the resulting concrete product while still in a highly mobile state may be accomplished in any conventional manner. This pervious concrete product is then applied by the following methods.

Figure 1:
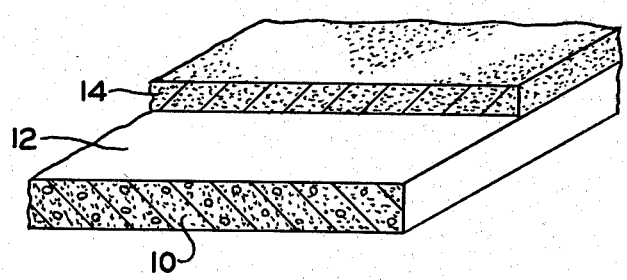
FIG. 1 shows application of the pervious concrete to an existing subgrade of previous concrete pavement.
Figure 2:
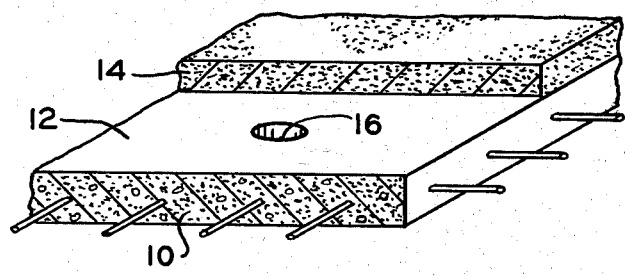
FIG. 2 shows application of the pervious concrete to an existing subgrade of reinforced concrete.

As shown in FIGS. 1 and 2, overlay of pervious or non-pervious paving comprises cleaning of the surface 12 of the existing paving 10 either mechanically or chemically by any known and acceptable method, such as air cleaning, jet spray, sand blasting, scrubbing with solvents, or the like. To the cleaned surface 12 a coating of cement and water mortar, mixed in a high energy/shear type mixer such as used in the preparation of pervious concrete may be applied. On the coated surface an overlay of pervious concrete 14 is directly applied to any required thickness, which results in a complete bonding between the overlay and the original pavement. To apply pervious concrete to reinforced concrete slab construction, in cases where lateral water movement may be undesirable, a similar procedure to the above is used after transverse penetration of the reinforced slab with holes or drain apertures 16 spaced so as to clear reinforcing steel and of sufficient size and area to permit the drainage of the combined slab. These holes will be filled with pervious concrete during the overlay procedure.

Figure 3:
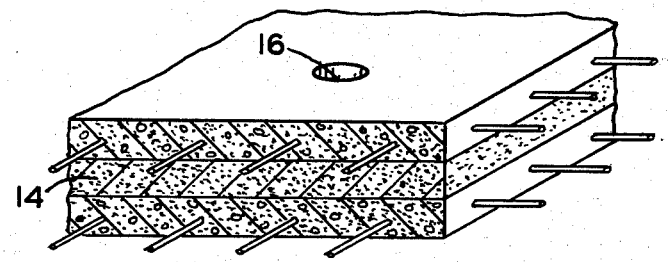
FIG. 3 shows application of the pervious concrete in sandwich fashion to an existing subgrade.
Figure 4:
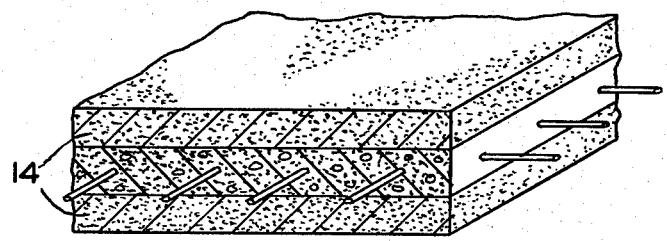
FIG. 4 shows an alternate application of the pervious concrete in sandwich fashion to an existing subgrade.

Finally, as shown in FIGS. 3 and 4, sandwich slabs, either of pervious concrete enclosing normal monolithic concrete, or the reverse, can be constructed by an obvious extension of the above technique.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method of producing a self-adhering pervious concrete product for paving of the type which allows fluids to pass therethrough in combination with an existing strata, said method comprising the steps of:
    (a) cleaning the surface of the existing strata;
    (b) supplying a predetermined quantity of cement;
    (c) supplying a predetermined quantity of water;
    (d) mixing together said predetermined quantities of cement and water to form a cementitious material utilizing high energy techniques, at least until said resulting cementitious material establishes a substantially consistent viscosity;
    (e) supplying a quantity of aggregate;
    (f) mixing said quantity of aggregate with said cementitious material to form said pervious concrete product;

(g) coating the surface with said pervious concrete product;
(h) directly applying pervious concrete product to the required thickness, which results in a complete bonding with the existing strata.

2. A method as in claim 1 further comprising the step of:
(i) penetration of the existing strata slab drain apertures sufficient size and area to permit the drainage of the combined slab to prevent lateral water movement of the interface of the combined slab.

3. A method as in claim 2 further including filling said drain apertures with pervious concrete during the overlay procedure.

4. A method as in claim 1 wherein sandwich slabs either of pervious concrete enclosing normal monolithic concrete, or the reverse are constructed.

5. A method as in claim 1 comprising cleaning the surface of the existing strata mechanically.

6. A method as in claim 1 comprising cleaning the surface of the existing strata chemically.

* * * * *